United States Patent [19]

Yoshino et al.

[11] Patent Number: 4,680,691
[45] Date of Patent: Jul. 14, 1987

[54] METHOD AND SYSTEM FOR PREVENTING AN EXCESSIVE VOLTAGE BUILD-UP IN A POWER CONVERTER SYSTEM

[75] Inventors: Teruo Yoshino; Katsuro Itoh, both of Fuchu, Japan

[73] Assignee: Kabushiki Kaisha Toshiba, Kawasaki, Japan

[21] Appl. No.: 871,365

[22] Filed: Jun. 6, 1986

[30] Foreign Application Priority Data

Jun. 10, 1985 [JP] Japan .................................. 60-124283

[51] Int. Cl.$^4$ ............................................. H02H 7/00
[52] U.S. Cl. ........................................ 363/51; 363/35
[58] Field of Search ........................ 363/35, 37, 51, 57; 361/86, 91, 100

[56] References Cited

U.S. PATENT DOCUMENTS

| | | | |
|---|---|---|---|
| 4,494,179 | 1/1985 | Inokuchi et al. | 363/35 |
| 4,553,197 | 11/1985 | Stemmler | 363/37 |
| 4,578,743 | 3/1986 | Inokuchi et al. | 363/35 |
| 4,600,981 | 7/1986 | Sakai et al. | 363/35 |

FOREIGN PATENT DOCUMENTS

| | | | |
|---|---|---|---|
| 61-157232 | 7/1986 | Japan . | |
| 0752607 | 7/1980 | U.S.S.R. | 363/35 |

OTHER PUBLICATIONS

Kawai et al., "Control and Protection Equipment for HVDC Transmission Systems", Hitachi Review, vol. 28, (1979), No. 4.

Primary Examiner—Patrick R. Salce
Assistant Examiner—Marc S. Hoff
Attorney, Agent, or Firm—Schwartz, Jeffery, Schwaab, Mack, Blumenthal & Evans

[57] ABSTRACT

A synchronous condenser is provided on an AC bus line which is connected to an AC power system via a circuit breaker. The AC bus line and a DC bus line are connected via a power converter system. In such a system, if three conditions: the breaker is opened; the synchronous condenser is under operation; and the power converter operates as an inverter, are met, the power converter is driven into a zero power factor operation, i.e., an operation to cancel a capacitive reactive power on the AC bus line including AC filters in order to prevent the synchronous condenser self-excitation.

4 Claims, 2 Drawing Figures

METHOD AND SYSTEM FOR PREVENTING AN EXCESSIVE VOLTAGE BUILD-UP IN A POWER CONVERTER SYSTEM

BACKGROUND OF THE INVENTION

Field of the Invention

The present invention relates to a method and a system for operating a power converter system.

Technical Background of the Invention and its Problems

FIG. 2 is a block diagram showing an example of a power converter system for power transmission. AC bus lines 1, 1' are connected via transformers 2, 2' to power converters 3, 3' constructed of, e.g., plural thyristors connected in series or parallel. By controlling the firing phase of the convertor, AC current is converted into DC current or vice versa. The system also includes reactors 4, 4', DC power transmission lines 5, potential transformers (P.T.) 6, 6', and current transformers (C.T.) 7, 7'. The control circuit for the power converter system is constructed of automatic current regulators (ACR) 8, 8', constant margin angle regulators (CER) 9, 9', and the like.

Besides the automatic current regulators 8, 8' and the constant margin angle regulators 9, 9', an automatic voltage regulator (AVR) and the like may be provided for maintaining the DC voltage constant. Calculated values by the automatic current regulators 8, 8' and the constant margin angle regulators 9, 9' are inputted as control voltages (Ec) to minimum value selection circuits (LVG) 10, 10' automatically selecting a control voltage which leads the control angle of the system to the smallest. The selected control voltages are limited by control voltage limiter circuits (EcL) 11, 11' respectively and are inputted to phase control circuits (PCC) 12, 12' which output firing pulses to the thyristors by determining firing phases corresponding to the selected control voltages. As is well known, in the power converter system constructed as above, one of the converters operates as a rectifier under constant current control while the other of the converters operates under constant margin angle control, by switching a current margin (I).

When a fault occurs in the converters or AC power systems, signals a, a' or b, b' are applied from protection units (PU) 13, 13' to the phase control circuits 12, 12' respectively for protection of the converters. The signals a, a' are used for a bypass pair operation, while the signals b, b' are used for a gate blocking operation. Generally the converters are protected by the bypass pair operation or the gate blocking operation.

Also, the power converters 3, 3' require a reactive power during their operations. Therefore, it is common to provide AC filters 14, 14' for removing harmonics and a synchronous condenser 15 for supplying a reactive power. Reference numerals 16, 16' designate the AC power systems, and reference numerals 17, 17' designate circuit breakers.

For convenience of description, it is assumed that the converter 3 of FIG. 2 works as inverter and the converter 3' works as rectifier.

When a fault occurs in the AC bus line 1 of the system, it is common to protect the system by opening the breaker near the fault point. However, while the converter 3 in the power converter system works as inverter and the inverter operation continues with the breaker 17 at the AC power system opened, energy is fed to the filter 14 from the DC system so that an excessive voltage is generated on the AC bus line. Further, if the converter 3 is stopped by a gate blocking operation to prevent energy from the DC system, there arises a risk of generating an excessive voltage on the AC bus line as well as a risk of self excitation phenomenon of the synchronous condenser 15 to accordingly generate an excessive voltage on the AC bus line 1 because the converter 3 does not consume a reactive power.

Furthermore, even if the converter 3 is driven into a bypass pair operation, the converter 3 does not consume a reactive power as in the case of a gate blocking operation. Thus, the synchronous condenser 15 is subjected to a self excitation phenomenon to make the AC bus line have an excessive voltage. Since non-conductive valves of the converter 3 under the bypass pair operation are applied with line voltages, excessive voltages are applied to the non-conductive valves, resulting in a possibility of breakdown of the power converter system.

SUMMARY OF THE INVENTION

In view of the above-described problems, an object of the present invention is to provide a method and a system for operating a power converter system without generating an excessive voltage.

To achieve the above object of the present invention, in a power converter connected to an AC power system provided with a synchronous condenser, if the power converter works as inverter while the synchronous condenser operates and a circuit breaker connected to the AC power system is opened to make the converter station load capacitive, then the power converter is driven in a zero power factor operation to consume a reactive power so that no energy from a DC system is received by the AC power system and an excessive voltage on the AC bus is prevented. Further, if the power converter works as rectifier, the operation may continue as it is to consume a reactive power and prevent an excessive voltage.

DESCRIPTION OF THE PREFERRED EMBODIMENT

Figure 1:
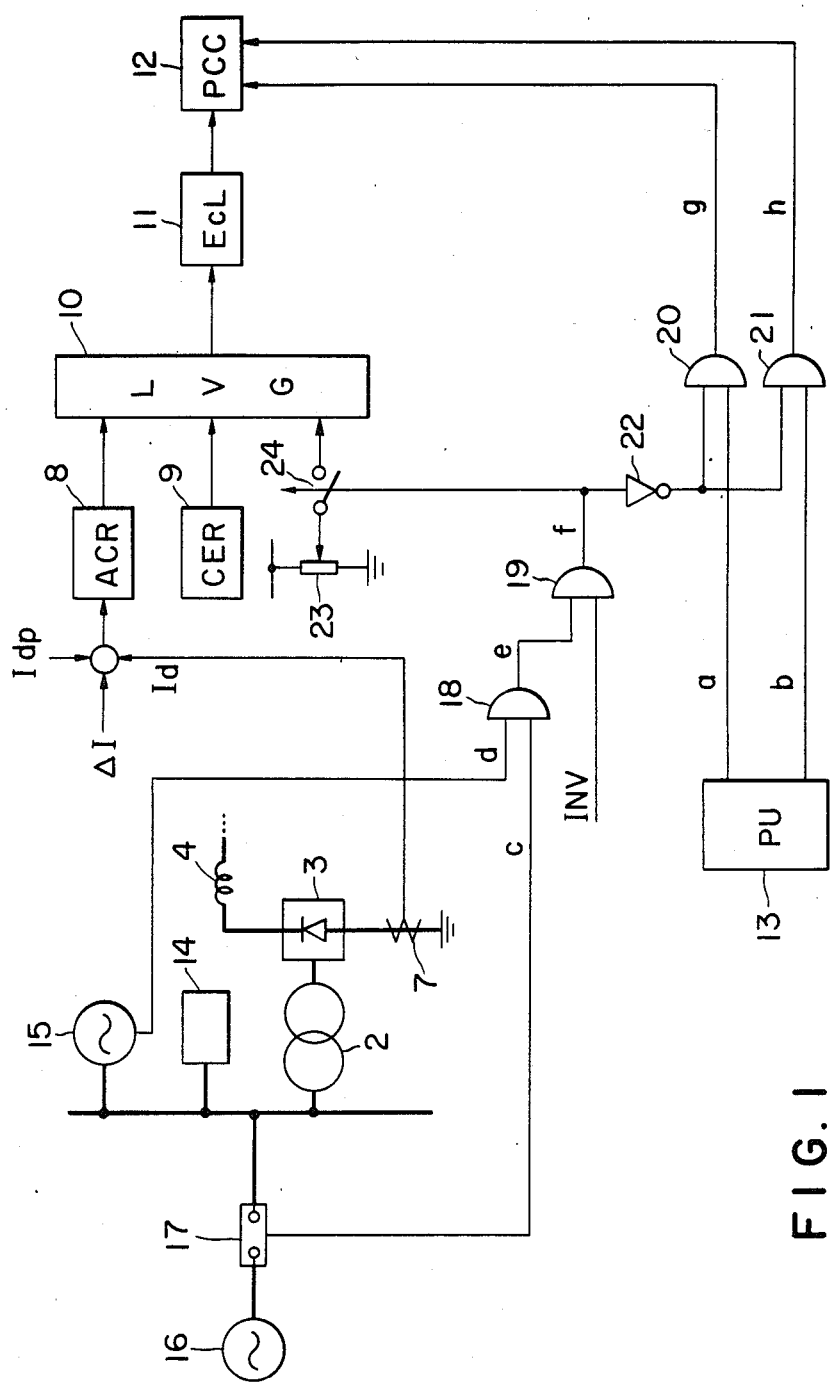
FIG. 1 is a block diagram of a power converter system according to an embodiment of the present invention.
Figure 2:
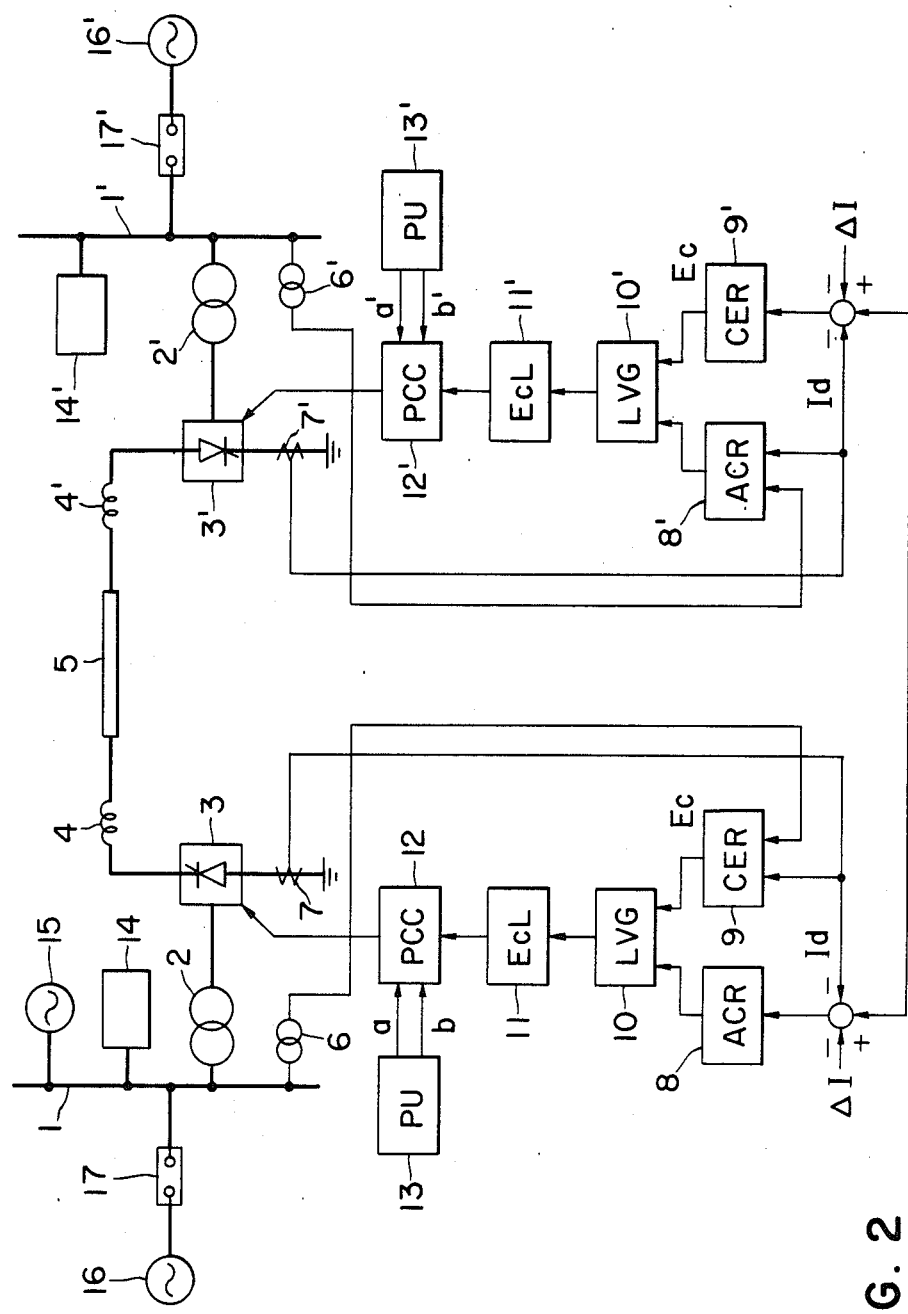
FIG. 2 is a block diagram of a conventional power converter system.

The embodiment of the present invention will now be described with reference to FIG. 1 wherein similar elements to those in FIG. 2 are designated by the same reference numerals and the description therefor is omitted. Reference numerals 18 to 21 represent AND gates, reference numeral 22 represents an inverter, 23 a firing angle setting device, 24 a switch, d a synchronous condenser status signal, and c a status signal of the circuit breaker 17. Signal INV indicates that the converter 3 operates as inverter, and signal f is a zero power factor operation command.

During an ordinary operation the breaker 17 is closed. Therefore, the signal c is "0" and hence the signal e is "0" so that the converter 3 operates without incorporating a zero power factor operation. Assume that the breaker 17 is opened during operation of the synchronous condenser 15. In this case, the signal d is "1" under operation of the synchronous condenser 15. When the breaker 17 is opened, the signal c also becomes "1" to make the output signal e of the AND gate 18 "1". In addition, when the converter 3 works as inverter, the signal INV becomes "1". As a result, the output f of the AND gate 19 becomes "1" to close the switch 24 and input a firing angle set by the firing angle setting device 23 to the minimum value selection circuit 10. The firing angle is set at about 90 degrees. Since the output angles of the automatic current regulator 8 and the constant margin angle circuit 9 are larger than 90 degress, the minimum value selection circuit 10 selects an input from the firing angle setting device 23 and outputs it. As a result, the firing angle of the converter 3 becomes about 90 degrees to start a zero power factor operation consuming a substantial reactive power. Since the converter 3 is driven into a zero power factor operation and current continues to flow in the DC system, there is no possibility of an excessive voltage. In addition, since no energy is fed from the DC system to the AC system, an excessive voltage on the AC bus line, which might be caused by energy from the DC power system, does not occur. Further, since the converter 3 consumes a reactive power during its operation, the synchronous condenser 15 is not subject to the self excitation phenomenon and the AC bus line 1 does not generate an excessive voltage. The DC current under a zero power factor operation is needed to be set such that the converter 3 consumes a reactive power corresponding to the capacitive reactive power on the AC bus line including AC filters 14. If the DC current is set too small, an excessive voltage on the AC bus line 1 may occur. On the other hand, if the DC current is set too large, the voltage at the AC bus line is lowered, resulting in a possible commutation failure of the converter 3.

If the converter 3 works as rectifier, energy is not fed from the DC system to the AC system so that the rectifier operation may be continued. In this case, since the signal INV becomes "0", the zero power factor operation command f also becomes "0" so that the zero power factor operation does not occur and the reactive power is consumed and an excessive voltage is suppressed under the continued rectifier operation. Similar to the case of the zero power factor inverter operation, it is necessary to set the DC current to correspond to the capacitive reactive power on the AC bus.

Signal a represents a bypass pair command for the converter 3, and signal b represents a gate blocking signal for the converter 3. The signal f passing through the inverter 22 and the bypass pair command a are inputted to the AND gate 20 so as to block the bypass pair command a when the breaker 17 is opened during operation of the synchronous condenser 15. Thus, the converter 3 is not driven into a bypass pair operation. Similarly, the signal f passing through the inverter 22 and the gate blocking signal b are inputted to the AND gate 21 so as to block the gate blocking signal b when the breaker 17 is opened while the synchronous condenser 15 operates. Thus, the converter 3 is not subjected to gate blocking. The AND gate 20 and 21 are provided for the purpose of continuing the consumption of the reactive power by the converter.

If the synchronous condenser 15 is not under operation, the signal f remains "0" even if the breaker is opened, resulting in a "1" output of the inverter 22. Therefore, the bypass pair command a or the gate blocking signal b from the protection unit 13 is not blocked by the AND gate 20 or 21. Consequently, if the signal a or b is "1", then the signal q or h becomes "1" to start the bypass pair operation or the gate blocking operation by the phase control circuit 12.

As seen from the foregoing description of the invention, it is possible to provide a method for operating the power converter system in which, even if the circuit breaker to the AC system is opened while the synchronous condenser operates, an excessive voltage by the self excitation of the synchronous condenser or an excessive voltage by energy fed from the AC power system, does not occur.

What is claimed is:

1. A method for operating a power converter connected between a DC bus line and an AC bus line, said AC bus line provided with a synchronous condenser and connected to an AC power system through a breaker, comprising the steps of:
   detecting whether or not said breaker is opened;
   detecting whether or not said synchronous condenser is under operation;
   detecting whether or not said power converter works as inverter; and
   driving said power converter at a firing angle cancelling a capacitive reactive power of said AC bus line when said breaker is opened, said synchronous condenser is under operation, and said power converter works as inverter.

2. A method for operating a power converter according to claim 1, wherein said firing angle is about 90 degrees.

3. A system for operating a power converter connected between a DC bus line and an AC bus line, said AC bus line provided with a synchronous condenser and connected to an AC power system through a breaker, comprising:
   first means for generating a second signal while said breaker is opened;
   second means for generating a second signal while said synchronous condenser is under operation;
   third means for generating a third signal while said power converter works as inverter; and
   control means for driving said power converter at a predetermined firing angle upon reception of said first, second and third signals thereby consuming on said AC bus line a reactive power sufficient for cancelling a capacitive reactive power of said AC bus line.

4. A system for operating a power converter according to claim 3, wherein:
   said control means comprises firing angle setting means for outputting a fourth signal corresponding to said predetermined firing angle; and
   said control means drives said power converter at said predetermined firing angle based on said fourth signal.

* * * * *